US005986017A

United States Patent [19]

Katagiri et al.

[11] Patent Number: 5,986,017

[45] Date of Patent: *Nov. 16, 1999

[54] TONER BINDER FOR FLASH FIXING, TONER, ELECTROSTATIC PHOTOGRAPHIC PRINTING METHOD AND APPARATUS THEREFOR

[75] Inventors: Yoshimichi Katagiri; Hitoshi Kusaba; Yasuharu Takeuchi; Yuzo Horikoshi; Makoto Koshi, all of Kawasaki; Hiroichi Ishihara, Kobe; Yoshiaki Ishibashi, Kakogawa; Yoshihiro Makuta; Jun Saito, both of Kawasaki; Hiroaki Naito, Hyogo, all of Japan

[73] Assignees: Fujitsu Limited, Kawasaki; Harima Chemicals, Inc., Kakogawa, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/528,042

[22] Filed: Sep. 14, 1995

[30] Foreign Application Priority Data

Sep. 19, 1994 [JP] Japan .................................... 6-223662

[51] Int. Cl.$^6$ ....................................................... C08F 20/00

[52] U.S. Cl. ........................... 525/438; 525/533; 430/109

[58] Field of Search .................................... 525/438, 533; 430/109

[56] References Cited

U.S. PATENT DOCUMENTS

| | | | |
|---|---|---|---|
| 2,297,691 | 10/1942 | Carlson | 95/5 |
| 4,508,806 | 4/1985 | Oseto et al. | 430/109 |
| 4,533,614 | 8/1985 | Fukumoto et al. | 430/109 |
| 4,626,488 | 12/1986 | Inoue | 430/109 |
| 4,981,939 | 1/1991 | Matsumura et al. | 527/604 |
| 5,276,127 | 1/1994 | Takyu et al. | 430/109 |
| 5,294,682 | 3/1994 | Fukuda et al. | 430/109 |
| 5,330,870 | 7/1994 | Tanaka et al. | 430/109 |
| 5,466,553 | 11/1995 | Okutani et al. | 430/109 |
| 5,486,444 | 1/1996 | Bayley et al. | 430/109 |

FOREIGN PATENT DOCUMENTS

| | | |
|---|---|---|
| 57-109825 | 7/1982 | Japan . |
| 63-193155 | 8/1988 | Japan . |
| 4-56869 | 2/1992 | Japan . |
| 5-10780 | 1/1993 | Japan . |
| 5-107805 | 4/1993 | Japan . |

*Primary Examiner*—Randy Gulakowski
*Attorney, Agent, or Firm*—Armstrong, Westerman, Hattori, McLeland & Naughton

[57] ABSTRACT

A toner binder comprising a crosslinked polyester resin obtained by using 0.1 to 3 mol % of trimellitic acid and 0.1 to 5 mol % of an epi-bis type epoxy in combination as crosslinking components, said binder having a number average molecular weight (Mn) in the chromatogram determined by a gel permeation chromatography on the non-gel portion of the polyester resin, of 2,000 to 4,000, a ratio (Mw/Mn) of the weight average molecular weight to the number average molecular weight of 10 to 25 and a (percent gel) of the residue unsoluble in tetrahydrofuran solvent of 1 wt % or less. A toner composition for flash fixing comprising the above-described binder as an essential constituent component. The toner and the toner binder exhibit good fixability and void resistance upon flash fixing and produce little fixing odor.

8 Claims, 5 Drawing Sheets

TONER BINDER FOR FLASH FIXING, TONER, ELECTROSTATIC PHOTOGRAPHIC PRINTING METHOD AND APPARATUS THEREFOR

BACKGROUND OF THE INVENTION

1. Field of the Invention

The present invention relates to a binder for toner used in flash fixing, a toner, an electrophotographic printing method and an apparatus therefor. More specifically, it relates to a toner exhibiting excellent fixability and void resistance during flashlight irradiation and having reduced fixing odor, an improved binder for the toner, an electrophotographing method using the toner and an apparatus therefor, pertaining to the toner used in the development of an electrostatic image for an electrophotograph and the like.

2. Description of Related Art

Electrophotography has been conventionally known to use such a system as described in U.S. Pat. No. 2,297,691, where a photoconductive insulator (e.g., a photoconductive drum) is commonly used, a uniform electrostatic charge is applied to the photoconductive insulator, for example, by corona discharge, a light image is irradiated on the photoconductive insulator by various means to form an electrostatic latent image, the latent image is developed and visualized using fine particles called toner and after the toner image is transferred, if desired, to paper or the like, the toner image is fixed onto the recording medium such as paper by means of pressurization, heating, exposure to solvent vapor or irradiation by light to obtain a printed matter.

The toner used for developing the electrostatic latent image is conventionally produced by dispersing a coloring agent such as carbon black in a binder resin comprising a natural or synthetic polymer material and finely granulating the obtained dispersion into particles approximately 5 to 20 $\mu$m in size. The toner may be used by itself or as a mixture thereof with a carrier such as an iron powder or glass beads in the development of an electrostatic latent image as the toner. In the case where an iron powder or other ferromagnetic powder is used as the carrier, the development is conducted in such a manner that the developing agent consisting of a toner and a carrier is mixed and stirred in a developing apparatus to charge the toner with frictional electrification, a magnet roll in the developing apparatus is rotated to form a magnetic brush, the magnetic brush is transported to the electrostatic latent image portion on the photoconductive sensitized material by rotation of the magnet roll and only the charged toner is adsorbed to the latent image due to the electrical attraction force. After the development, the developing agent which has reduced in toner density is replenished by new toner to maintain the toner density constant and can be repeatedly used.

On the other hand, the toner powder image formed on the photosensitive drum is transferred onto a recording medium (e.g., paper) by corona transfer or roller transfer. The toner powder image transferred to the recording medium is attached to the paper in the state of powder forming an image, where if it is rubbed, for example, by a finger, the powder image is damaged. In order to fix the toner powder image on the recording medium, the powder image must be melted to fix it to the recording medium and various methods are used therefor. Among these methods, the flash fixing method, as a representative example of a photofixing method, is conducted by flash of light from a discharge tube such as a xenon flash lamp and is characterized as follows:

1) due to non-contact fixing, the resolution of a developed image is not deteriorated, 2) the stand-by time after a power source is turned on is not required and a quick start can be realized, 3) even when jamming of the recording paper is caused in the fixing device due to a system failure, ignition is not caused, and 4) fixing is possible irrespective of material or thickness of the recording paper, such as glued paper, preprinted paper or paper of different thickness.

Fixing the toner to the recording paper by flash fixing occurs through the following procedure. As described above, the toner image adheres to the recording paper as a powder when it is transferred to the recording paper and it is readily damaged by rubbing, for example, with a finger. When the flash of light from a discharge tube such as a xenon flash lamp is irradiated thereto, the toner absorbs the energy of flash light, its temperature is raised and thereby the toner is softened and melted to tightly adhere to the recording paper. At the end of the flash of irradiation, the temperature lowers to solidify the image to form a fixed image, thus accomplishing the fixing, and the fixed image firmly adhered to the recording paper is not damaged even when it is rubbed, for example, with a finger.

It is important in flash fixing that the toner is melted and firmly adheres to the recording paper and therefore, the toner must be thoroughly melted by absorbing energy from the flash of light. The total light energy must include not only the energy for melting the toner but also the heat energy diffusing outside and not contributing to the increase of temperature. Accordingly, if the total light energy given is insufficient, the toner cannot be melted thoroughly and as a result, the fixing obtained is not satisfactory. When the light energy is absorbed by the toner, the toner is melted and its viscoelasticity is abruptly lowered.

The physical properties of the melted toner, such as viscoelasticity and surface tension, vary greatly depending on the material and the melting temperature of the binder resin constituting the toner and if the surface tension of the toner at the time of melting and fixing overpowers the viscoelasticity thereof, the toner aggregates and the toner which was uniformly present on the image portion moves to cause an image drop-out phenomenon called a void (aggregation void) on the fixed image, resulting in a reduction in the image density. Further, if an excess amount of energy is given, the toner boils and the melted toner is blown off by the explosive expansion of gas present in spaces in the toner powder image and the gas generated by the toner decomposition, to generate a void (explosion void) in the fixed image to thereby cause a reduction in the image density.

Accordingly, the toner must not be hardly susceptible to the generation of voids due to aggregation or moving of the toner and in this concern, the use of a binder resin having a low surface tension and a high viscoelasticity is needed so that the viscoelasticity of toner overpowers the surface tension during melting.

As known from the foregoing, in order to have good fixability, in the flash fixing system, the total amount of light energy irradiated must be sufficiently large and the toner used or the binder resin constituting the toner must have physical properties of a low melting point and a low melt viscoelasticity so that it swiftly absorbs the light energy of flash light and melts to permeate the recording medium such as paper. On the other hand, in order to prevent voids, in the flash fixing system, excessive energy must not be applied but the energy must be applied to the toner in such a manner that melt properties (e.g., melting temperature) of the toner are controlled and the toner used needs to have a melt viscoelasticity sufficiently high to prevent movement of the toner causing generation of voids.

The toner for flash fixing must also not generate a bad odor even if it is heated to a high temperature during flash fixing.

The main object of the present invention is to provide a toner and a binder for the toner which have excellent fixability and void resistance in flash fixing and have a low fixing odor.

DISCLOSURE OF THE INVENTION

In order to achieve the above-described object, the present invention provides a toner binder comprising a crosslinked polyester resin obtained by using in combination 0.1 to 3 mol % of a trimellitic acid and 0.1 to 5 mol % of an epi-bis type epoxy as crosslinking components, the polyester resin having a number average molecular weight (Mn) in the chromatogram determined by a gel permeation chromatography on the non-gel portion of the polyester resin, of 2,000 to 4,000, a ratio (Mw/Mn) of the weight average molecular weight to the number average molecular weight of 10 to 25 and a residue (gel proportion) not dissolved to the tetrahydrofuran solvent of 1 wt % or less.

Preferably, the essential constituent monomers of the binder acid component comprise 80 mol % or more of a terephthalic acid and/or isophthalic acid and the alcohol component comprises 15 to 70 mol % of aliphatic diol having 5 or less carbon atoms and a methyl side chain and 30 to 85 mol % of an etherified bisphenol A. The epi-bis type epoxy used as a crosslinking agent preferably has a molecular weight of 1,500 or less.

The present invention also provides a toner comprising the above-described toner binder as an essential constituent and an electrophotographing apparatus characterized by using the above-described toner and, after developing and transferring the electrostatic image, flash fixing the toner image.

A first gist of the present invention resides in that by employing a crosslinked polyester obtained with a specific crosslinkable agent as an essential binder resin for the toner, the binder resin can be controlled to have a specific configuration of the molecular weight distribution which greatly affects the melt viscoelasticity of the toner and can have a good permeability to the recording medium.

In order to provide a toner with high void resistance and excellent fixability at the same time, the toner should have melt viscoelasticity in high-temperature melting state and melt viscoelasticity in low-temperature melting state, as described in Japanese Unexamined Patent Publication (kokai) No. 4-56869.

The present inventors have made intensive investigations to achieve both fixability and void resistance at an extremely high level and as a result, have found that the desired melt viscoelasticity is about 90 to 130 poise at 200° C. and about 35,000 to 65,000 poise at 120° C.

The desired fixability intended by the present inventors means 95 to 100% in terms of fixing ratio determined by the Scotch Mending Tape peeling-off test, and the desired void resistance means 90% or more in terms of image covering ratio after flash fixing, which will be described later in detail.

As an effective means to impart the viscoelasticity to the toner for flash fixing, Japanese Unexamined Patent Application (kokai) Nos. 57-109825 and 5-107805 propose to introduce a crosslinking structure into the polyester by incorporating a trace amount of a multifunctional monomer such as trimellitic acid thereinto and Japanese Unexamined Patent Application (kokai) No. 4-56869 proposes a means to blend a plurality of binders different in the melt viscoelasticity. However, when crosslinking for imparting a desired viscoelasticity is obtained only by trimellitic acid, the peak molecular weight, in the chromatogram determined by gel permeation chromatography, is shifted to the high molecular weight side, the amount of the low molecular weight component being reduced, and, further, an excessive amount of gel component is formed in many cases.

Here, inconvenience is caused in that, if the trimellitic acid content is increased too much, the void resistance may be ameliorated but the fixability is deteriorated, whereas if the addition amount of trimellitic acid is reduced too much, a desired viscoelasticity cannot be obtained, and the fixability and the void resistance cannot be achieved at the same time.

According to the investigation by the present inventors, as the trimellitic acid content increases, the fixing odor becomes irritating and thus the trimellitic acid content needs to be 3.0% or less, preferably 2.0% or less, but with a trimellitic acid content as low as this, a desired viscoelasticity cannot be obtained.

Also, according to the investigation by the present inventors, when high levels of fixability and void resistance are intended to become concomitant by means such as blending of binders, as described in Japanese Unexamined Patent Publication (kokai) No. 4-56869, a binder having an extremely high viscosity and a binder having a low viscosity need to be blended and the compatibility between two binders is very likely to be poor, therefore, binders form a sea/island structure in the toner and are not mixed uniformly with each other, resulting in unsatisfactory color tone, electrostatic charge characteristics and rupture strength of the toner and thus the results obtained are not satisfactory.

As a result of investigations, the present inventors have found that, in order to overcome these problems and to simultaneously achieve fixability and void resistance, at a high level, it is essential to optimize the molecular weight distribution of the binder, as an item having a great effect on the melt viscoelasticity of binder, and also to optimize the molecular configuration of the binder in relation to the permeability to the recording medium, and have accomplished the present invention.

First, with respect to optimization in the molecular weight distribution, according to the finding of the present inventors, a predetermined amount of a low molecular weight component must be present to impart good fixability to the toner and the required amount for the low molecular weight component can be defined by 4,000 or less in terms of the number average molecular weight (Mn) and 25 or less in terms of the ratio (Mw/Mn) of the weight average molecular weight (Mw) to the number average molecular weight (Mn). In order to have such a content of the low molecular weight component and impart a desired viscoelasticity to the toner, the present inventors used trimellitic acid and an epi-bis type epoxy in combination, as crosslinking agents for the polyester, and accomplished the present invention.

According to the present inventors, the combined use of the above crosslinking agents has the following advantages.

First, when using the trifunctional or higher functional acids such as trimellitic acid and pyromellitic acid or trifunctional or higher functional alcohols such as glycerine, trimethylolpropane and pentaerythritol, which have been conventionally used as a crosslinking agent in many cases, the molecular weight of the crosslinking component is low and the functional groups as crosslinking points are adjacent, therefore, the polymer chains extending from respective crosslinking points cannot be extended uniformly due to an effect such as steric hindrance. Also, in the case where isocyanates are used as crosslinking agents, the polymer chains are susceptible to the same steric hindrance. Accordingly, as shown in FIG. 4, the molecular weight distribution takes such a configuration that an explicit peak top is present at a specific molecular weight value and since the molecular weight at the peak changes according to the amount of added crosslinking agent, and if the peak is present on the high molecular weight side, the void resistance may be ameliorated but the fixability is inferior, whereas if the top peak is present on the low molecular weight side, the void resistance stays at an unsatisfactory level.

On the contrary, in the case where an epi-bis type epoxy resin is used as a crosslinking chain, the crosslinking points lie at the glycidyl groups present at each end of the epoxy resin and at the hydroxyl groups between the repeating units such as bisphenol A and therefore, the polymer chain can extend uniformly from each crosslinking point due to a sufficient distance between respective crosslinking points. As a result, as shown in FIG. 3, the molecular weight distribution configuration is relatively close to a trapezoid showing a relatively low viscosity at low temperatures and a relatively high viscosity at high temperatures and thus, the void resistance and fixability of an extremely high level can be realized.

With respect to permeability to the recording medium, in comparing cases where polymers having the same molecular weight are produced, using as the crosslinking agent trimellitic acid solely or trimellitic acid and an epi-bis type epoxy resin in combination, the following can be pointed out. In the case of crosslinking by only trimellitic acid, a gel is readily formed and the polymer chains extending from the crosslinking points are not uniform and therefore, the molecule itself becomes bulky, resulting in poor permeability to the recording medium. On the other hand, in the case of crosslinking by a combined use of trimellitic acid with an epi-bis type epoxy resin, the molecule is relatively less bulky and the molecular chains extending from the crosslinking points are not susceptible to steric hindrance and are free and, therefore, the crosslinking chains can act as a soft segment, so that excellent melt viscoelasticity and permeability to the recording medium of the toner binder can be achieved.

A representative example of the epi-bis type epoxy resin which can be used in the present invention is the compound represented by the following formula:

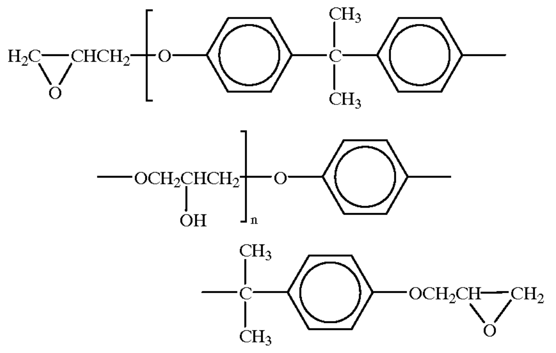

This resin is produced by the reaction of epichlorohydrin with bisphenol A or bisphenol F and representative commercial products thereof are Epicote 828, 1001 and 1004 produced by Yuka Shell Epoxy KK.

The molecular weight of the epoxy resin is preferably 1,500 or less because if the crosslinking chain of the resin becomes long and exceeds a certain level, there arises a problem of reduction in glass transition temperature. Also, a graft copolymer of an epi-bis type epoxy resin with another copolymer component or a graft polymer obtained by polymerizing a functional group of the epi-bis type epoxy with other copolymer component may be used as the crosslinking chain, however, according to the finding of the present inventors, when using a block copolymer or a graft copolymer of the epi-bis type epoxy resin as a crosslinking agent, the reduction in glass transition temperature or reduction in fixability is caused in many cases and favorable results are often not provided. The present inventors assume that this is because block or graft copolymerization of the crosslinking molecular chain restricts the steric freedom of the crosslinking molecular chain and makes it difficult for the crosslinking chain to effectively act as a soft segment.

The second gist of the present invention resides in the finding, as a result of investigation on combinations of various monomers constituting the skeleton structure of the polyester, of monomer compositions having a high affinity to the recording medium and favored physical properties such as melting point and glass transition point suitable for the toner.

According to the investigation by the present inventors, in order to increase the affinity to the recording medium (in particular, paper), it is preferred to incorporate a large quantity of soft segment components or to incorporate a monomer having a large number of branched chains, however, the incorporation of such a component brings about reduction in the glass transition temperature of the toner and causes a problem with respect to the storage stability of the toner. These contradictory propositions are overcome by the finding that a monomer composition can have, while retaining a glass transition temperature of 65° C. or higher, an excellent affinity (permeability) to the recording medium and excellent fixability. The composition comprises 80 mol % or more of a terephthalic acid and/or an isophthalic acid in the acid component, and on the alcohol component of 15 to 70 mol % of an aliphatic diol having 5 or less carbon atoms and a methyl side chain and 30 to 85 mol % of etherified bisphenol A.

The alcohol components may be selected from etherified bisphenol A, 1,2-propylene glycol, 1,3-butanediol, and neopethyl glycol. The acid components may be selected from terephthalic acid and isophthalic acid.

The etheried bisphenol A which is employed in the present invention is obtained by conducting the addition reaction of bisphenol A and an alkylene oxide such as ethylene oxide or propylene oxide. Those having an added average number of 2 to 10 moles per mole of bisphenol A can suitably used.

As for aliphatic diols having a methyl side chain and 5 or less carbon atoms, 1,2-propylene glycol, 1,3-butanediol, and neopentyl glycol are examples thereof.

A small amount (10% or less by mole of all alcohol components) of the other alcohols can be used, besides the etherified bisphenol A, aliphatic diols mentioned above, and epi-bis type epoxy resin.

As for the above alcohol components, etylene glycol, diethylene glycol, triethylene glycol, 1,3-propylene glycol, 1,4-butanediol, hydrogenated bisphenol A and the like can be given as the examples thereof.

A small amount (17% or less by mole of all acid components) of the other acids can be used, besides terephthalic acid, isophthalic acid, and trimellitic acid.

As for the above acid components, phthalic acid, maleic acid, fumaric acid, succinic acid, adipic acid, and the like can be given as the examples thereof.

In the toner binder, it is preferred that the ratio of the number of carboxyl groups in all acid components to the number of hydroxyl groups in all alcohol components is within the range of 0.8 to 1.2.

The present inventors consider that the methyl side chain has the following two effects. First, due to the presence of the side chain, the polyester is inhibited from being crystallized and even when it has a molecular weight sufficiently high to provide a long chain and a high melt viscosity, the melting point thereof is relatively low and therefore, the fixability can be easily attained. Secondly, due to the side chain of the molecule, tangling of the molecules increases to ensure the melt viscosity and also, tangling of the polyester with molecules of the recording medium easily occurs to increase the bonding ability.

The reason why the side chain is limited to the methyl chain is that if the side chain is a hydrocarbon chain having 2 or more carbon atoms, the degree of freedom of the side chain is increased so that the glass transition temperature is conspicuously reduced.

Further, the reason why the gel proportion is limited to 1.0 wt % or less is that, if the gel proportion exceeds this range, the fixability at a high level cannot be retained.

The binder resin for use in the present invention can be produced by conventionally known methods. More specifically, it may be produced by condensation polymerization of the acid component with the alcohol component at a temperature of from 150 to 280° C. and in this case, a catalyst such as di-n-butyl tin oxide may be added to accelerate the reaction or the reaction may be conducted under reflux of a solvent or under reduced pressure. Further, by changing the carboxylic acid group to a lower ester such as methyl ester, transesterification may be conducted.

The toner used in the present invention can be produced by conventionally known methods. More specifically, a binder resin, a coloring agent and if desired, carbon and an electrostatic charge controlling agent are melt-kneaded, for example, in a pressure kneader, a roll mill or an extruder to disperse them uniformly, finely ground, for example, by a jet mill and then classified by a classifier such as a pneumatic classifier to obtain a desired toner. A representative toner composition comprises carbon as a pigment or an electroconductivity-imparting agent in an amount of from 3 to 10%, preferably from 3 to 5%, an electrostatic charge controlling agent in an amount of from 1 to 5% and a lubricant in an amount of 1% or less, each based on the binder. Accordingly, the binder is mostly present in an amount of approximately from 80 to 95%. The toner particle size is typically from 5 to 20 μm.

The binder for flash fixing and the toner for flash fixing described specifically in the foregoing have excellent flash fixability and void resistance and exhibit good color tone, electrostatic characteristics and storage stability.

An electrophotographing method using flash fixing and an apparatus therefor are described below by referring to the drawings attached.

In FIGS. 1A, 1B and 1C, a toner 1 in the state of powder is bonded onto a recording medium 2 and upon irradiation by a flash of light 3, the surface layer portion 1 of the toner is melted and as the heat conduction gradually proceeds, the toner on the lower layer portion is melted. In the case where the toner of the present invention is not used, the toner undergoes coagulation due to the surface tension of toner to generate a void 5 in the fixed image. When the toner of the present invention is used, no void is generated.

The toner of the present invention is preferably used, for example, in an electrophotographic apparatus as shown in FIG. 2. First, a developing agent comprising a mixture of the toner of the present invention and a magnetic powder such as iron powder is used. The developing agent 11 is mixed and stirred by means of stirring screws 12 to charge the toner with frictional electrification. The toner charged with frictional electrification is transported by a development roller 13 to a photosensitive drum 14 and the charged toner adheres to the photosensitive drum according to the electrostatic image pattern on the photosensitive drum 14 to provide a visible image. The toner image on the drum is transferred to a recording medium 15, for example, paper, and heated and melted by a flash of light 17 so that the toner penetrates into the paper to provide a fixed image 18. In FIG. 2, the numeral 16 stands for a transfer portion, 19 a pre-electrification part and 20 an exposure portion.

The above-described printing method and electrophotographic apparatus are excellent owing to the characteristics described below. First, the fixing system uses flash fixing and therefore, the following advantages can be provided:

1) due to non-contact fixing, the resolution of a developed image is not deteriorated,
2) the stand-by time after a power source is turned on is not required and a quick start can be realized,
3) even when jamming of the recording paper is caused in the fixing device due to a system failure, ignition is not caused, and
4) printing is possible irrespective of materials or thickness of the recording paper, such as pasted paper, preprint paper or papers different in thickness. Further, since the toner of the present invention is used, excellent flash fixability and superior void resistance can be achieved and thereby a high-quality fixed image can be obtained.

The values of various physical properties set forth in the present invention, including those in examples, are determined according to the measurement methods described below.

[Melting Point (Softening Point)]

A temperature flow test was conducted using a Shimadzu Flow Tester (CFT-500, manufactured by Shimadzu Seisakusho) under the following measurement conditions and the temperature when the plunger descended 4 mm was determined to be the melting point.

| | |
|---|---|
| Die | 1.0 mmφ × 1.0 mm |
| Temperature increase rate | 6° C./min |
| Sample | 1.0 g pellets |
| Load | 20 kg/cm$^2$ |
| Pre-heating temperature | 60° C. |
| Pre-heating time | 300 sec |

[Glass Transition Temperature]

The temperature rise endothermic curve was measured using a differential scanning calorimeter (DSC-3100, manufactured by Mac Science KK) under the following conditions and the inflection point was determined by extrapolation.

| | |
|---|---|
| Temperature increase rate | 20 ° C. /min |
| Sample | 4 mg (crimper die) |

[Viscoelasticity]

A constant temperature flow test was conducted using a Shimadzu Flow Tester (CFT-500, manufactured by Shimadzu Seisakusho) under the following measurement conditions and the viscoelasticity was determined from the flow value.

| | |
|---|---|
| High temperature measurement | |
| Die | 0.5 mmφ × 10.0 mm |
| Measurement temperature | 200° C. |
| Sample | 1.0 g pellets |
| Load | 10 kg/$cm^2$ |
| Low temperature measurement | |
| Die | 1.0 mmφ × 1.0 mm |
| Measurement temperature | 120° C. |
| Sample | 1.0 g pellets |
| Load | 20 kg/$cm^2$ |

[Molecular Weight and Molecular Weight Distribution]

The chromatogram determined by a gel permeation chromatograph (HLC-8020, manufactured by Tosoh Corporation) was calculated in terms of a calibration curve formed by a monodispersed polystyrene standard sample.

| | |
|---|---|
| Column | TSK GEL G2000HLX, G3000HLX, G4000HLX |
| Solvent | tetrahydrofuran |
| Column temperature | 40° C. |
| Flow rate | 1.0 ml/min |

[Gel Proportion]

A polyester resin with no crosslinking component as a monomer was used as a reference. The reference was dissolved in a tetrahydrofuran solvent to provide a 0.3% solution thereof and the area of the peak was determined by the gel permeation chromatography. Separately, a test sample was also adjusted to a 0.3% tetrahydrofuran solution for determination of the molecular weight and the resulting solution was filtered through a filter having a pore size of 0.45 μm to remove the gel content. Thereafter, the peak area was determined by gel permeation chromatography. The peak areas of these two solutions were compared and calculated.

According to the present invention, good fixability and void resistance during flash fixing can be achieved at the same time and the both toner and the toner binder are low in fixing odor.

Figure 1A:
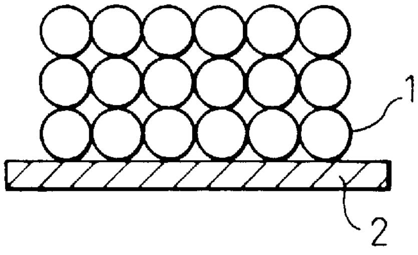
FIGS. 1A to 1C show the generation of voids in flash fixing.
Figure 1B:
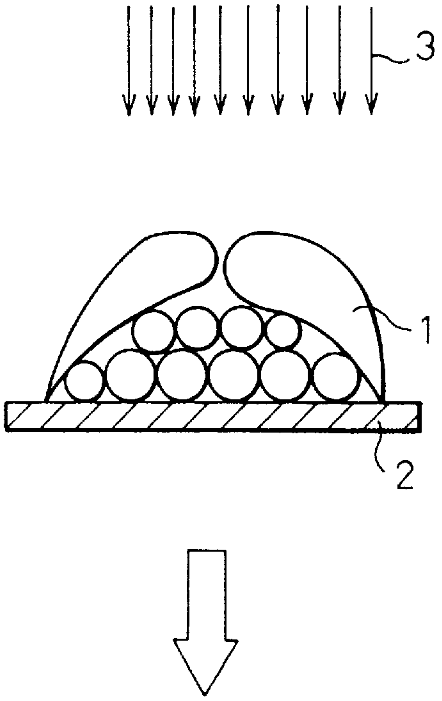
Figure 1C:
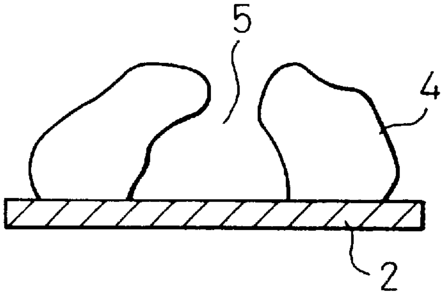
Figure 2:
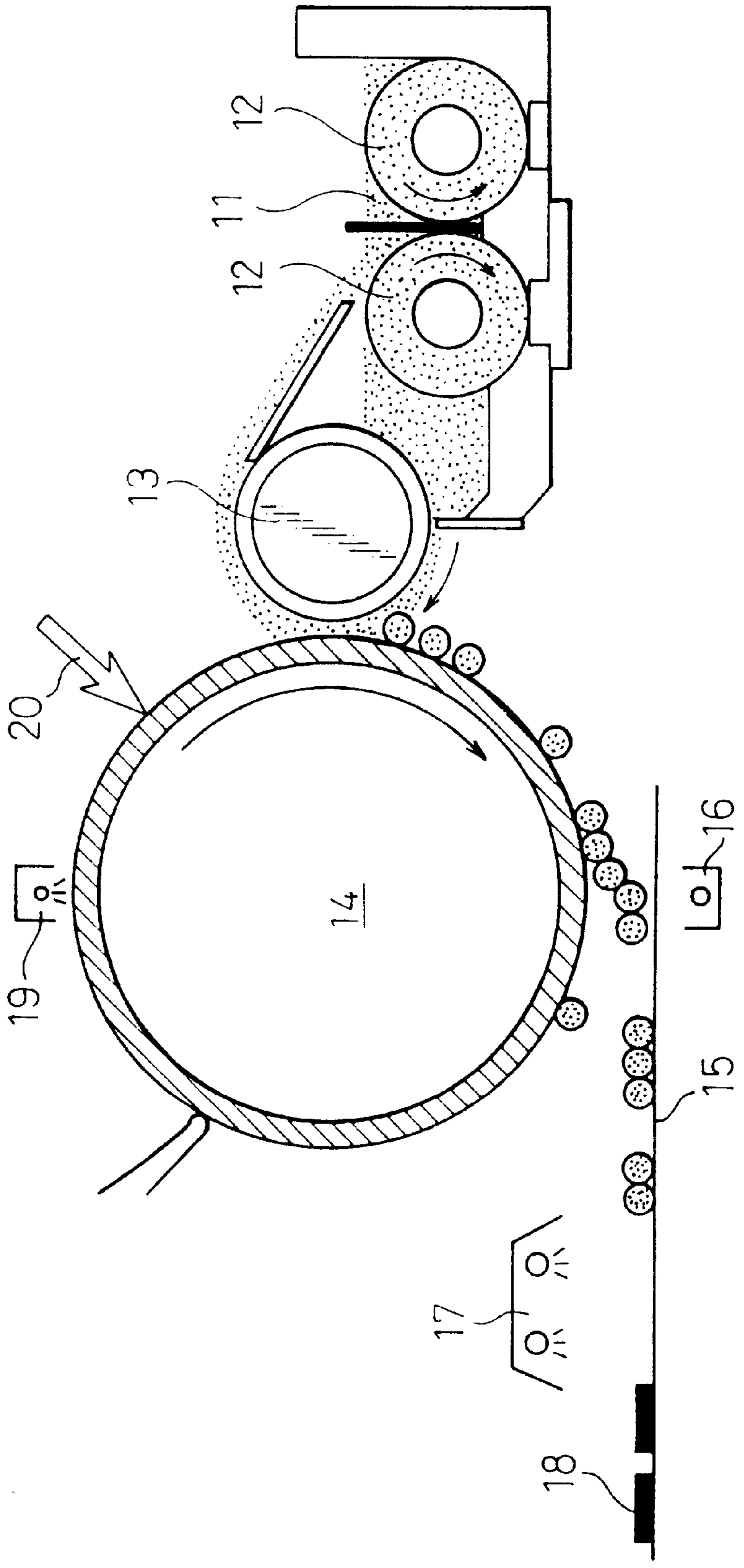
FIG. 2 shows a flash fixing apparatus.

The present invention will be described below in greater detail with reference to the examples but the present invention should not be construed as being limited thereto.

EXAMPLES

Example 1

632 g (1.8 mol) of polyoxypropylene (2)-2,2-bis(4-hydroxyphenyl)propane, 490 g (1.5 mol) of polyoxyethylene (2)-2,2-bis(4-hydroxyphenyl)propane, 221 g (2.46 mol) of 1,3-butanediol, 108 g (0.12 mol) of Epicote 1001, 598 g (3.6 mol) of terephthalic acid, 299 g (1.8 mol) of isophthalic acid, 23.0 g (0.12 mol) of trimellitic acid anhydride and 2.3 g of di-n-butyl tin oxide were poured in a four-neck 3-liter flask made of glass and after furnishing the flask equiped with a thermometer, a stirrer, a flow down-type condenser and a nitrogen-introducing tube, the ingredients were reacted under a nitrogen stream at 220° C. while stirring in an electrothermic mantle. When the temperature reached the softening point, namely, 118° C., the condensation polymerization was terminated. The resulting polyester resin was a light yellow, transparent solid having the physical properties as shown in Table 2.

92 parts by weight of the polyester obtained above as a binder resin, 5 parts by weight of carbon black (Black Pearls L, produced by Cabot KK) as a coloring agent and 3 parts by weight of a nigrosine dye (Bontron N-04, produced by Orient Kagaku Kogyo KK) as an electrostatic charge controlling agent were mixed and melt-kneaded in a pressure kneader at 130° C. for 30 minutes to obtain a toner lump. After cooling, the toner lump was finely ground using a Lawtoplex grinder and a jet mell (PJM Grinder, manufactured by Nippon Pneumatic Kogyo KK) and the crushed matter was classified by a pneumatic classifier (manufactured by Alpine KK) to obtain a positively chargeable toner having a particle size of from 5 to 20 μm. The manufacturability of the toner was good.

Then, a developing agent consisting of 5 parts by weight of the toner and 95 parts by weight of an irregular-shape iron powder TSSV100/200 (produced by Powdertec KK) as a carrier was prepared.

In order to evaluate the flash fixability of the toner, a 1 inch×1 inch solid image was printed using a laser printer (F-6715E, manufactured by Fujitsu KK) employing a flash fixing system and a tape peeling test was conducted thereon. The fixing device conditions were such that a 160 μF condenser was used and the charging voltage of 2,050 V was applied to the flash lamp. The toner layer amount of the solid image on the recording medium was about 9 mg/$cm^2$. The tape peeling test was conducted in such a manner that a pressure sensitive adhesive tape (Scotch Mending Tape, produced by Sumitomo 3M KK) was lightly affixed to the solid image portion, an iron-made cylindrical block having a diameter of 100 mm and a thickness of 20 mm was rolled at a constant speed in contact with the recording medium on the tape and then the tape was peeled off from the recording medium. As the index for fixability, excellency of the fixability was determined based on the ratio (percentage) of the optical image density (OD) after to before the peeling off of the tape. When the ratio is 95% or more, the fixability rated good. The result of the above evaluation on fixability was 96% as shown in Table 3 and good.

The optical image density was then measured using a PCM Meter (manufactured by Macbeth KK). The result was 1.35 of OD as shown in Table 3 and good.

The amount of void formed in the fixed image was determined as the ratio (covering ratio) of area where the toner was attached to the total area in a microphotograph of the fixed image, analyzed by an image analyzer (Ruzex 2000, manufactured by Nireco KK), and the void resistance was rated good when the ratio was 90% or more. The result of the void resistance in this example was good and provided a covering ratio of 95% as shown in Table 3.

The heat stability of the toner was evaluated by the weight of toner left after the removal of toners with a size 200 mesh (75 μm) or less from the toner, which was taken out from a polyester-made bottle where 20 g of toner had been charged and exposed to the environment of 60° C. and 30% RH for 12 hours. When the toner weight left was 10 wt % or less, the heat stability rated good.

In this example, the amount of the toner left on the mesh was 5 wt % and the heat stability was satisfactory.

The fixing odor was evaluated, in a sensory manner, on the odor generated during a continuous printing test for 10 minutes. When 90% or more of panelists determined, the odor to be less odorous, the fixing odor rated good. In this example, all panelists found to be no problem with the odor.

From the foregoing, it is understood that the toner and the toner binder in Example 1 had fixability and void resistance at extremely high levels and also that it was very satisfactory in physical properties such as storage stability.

Example 2

A polyester resin was produced in the same manner as in Example 1 using the monomer blend shown in Table 1 and the polyester resin obtained had physical properties as shown in Table 2. The polyester resin was formulated into a toner in the same manner as in Example 1 and then subjected to the same evaluation as in Example 1. As seen from Table 3, the resulting toner had fixability and void resistance at extremely high levels such that the fixability according to the tape peeling test was 100% and the covering ratio was 93% and the physical properties of the toner such as storage stability were very satisfactory.

Example 3

A polyester resin was produced in the same manner as in Example 1 using the monomer blend shown in Table 1 and the polyester resin obtained had physical properties as shown in Table 2. The polyester resin was formulated into a toner in the same manner as in Example 1 and then subjected to the same evaluation as in Example 1. As seen from Table 3, the resulting toner had fixability and void resistance at extremely high levels such that the fixability according to the tape peeling test was 95% and the covering ratio was 92% and the physical properties of the toner such as storage stability were very satisfactory.

Example 4

A polyester resin was produced in the same manner as in Example 1 using the monomer blend shown in Table 1 and the polyester resin obtained had physical properties as shown in Table 2. The polyester resin was formulated into a toner in the same manner as in Example 1 and then subjected to the same evaluation as in Example 1. As seen from Table 3, the resulting toner had fixability and void resistance at extremely high levels such that the fixability according to the tape peeling test was 100% and the covering ratio was 88% and the physical properties of the toner such as storage stability were very satisfactory.

Example 5

A polyester resin was produced in the same manner as in Example 1 using the monomer blend shown in Table 1 and the polyester resin obtained had physical properties as shown in Table 2. The polyester resin was formulated into a toner in the same manner as in Example 1 and then subjected to the same evaluation as in Example 1. As seen from Table 3, the resulting toner had fixability and void resistance at extremely high levels such that the fixability according to the tape peeling test was 90% and the covering ratio was 95% and the physical properties of the toner such as storage stability were very satisfactory.

Example 6

A polyester resin was produced in the same manner as in Example 1 using the monomer blend shown in Table 1 and the polyester resin obtained had physical properties as shown in Table 2. The polyester resin was formulated into a toner in the same manner as in Example 1 and then subjected to the same evaluation as in Example 1. As seen from Table 3, the resulting toner had fixability and void resistance simultaneously at extremely high levels such that the fixability according to the tape peeling test was 98% and the covering ratio was 95% but the glass transition temperature of the toner was low as 55° C. and, as a result, the toner could not be stored at a high temperature and thus the toner performance was slightly unsatisfactory in view of storage stability though it caused no problem in normal use.

Example 7

A polyester resin was produced in the same manner as in Example 1 using the monomer blend shown in Table 1 and the polyester resin obtained had physical properties as shown in Table 2. The polyester resin was formulated into a toner in the same manner as in Example 1 and then subjected to the same evaluation as in Example 1. As seen from Table 3, although the covering ratio was 92%, the fixability was slightly unsatisfactory in performance at 82%. Also, the grinding efficiency in producing the toner was a little low. The present inventors assume that this phenomenon was caused by the use of a monomer component having no methyl side chain, the crystallinity of binder was increased and when the molecular weight was increased sufficiently high to provide the melt viscosity necessary to maintain the void resistance, the melting temperature rose to as high as 130° C., therefore, the toner melted insufficiently during light irradiation on the surface where the lower portion of the toner powder image was in contact with the recording medium.

Example 8

A polyester resin was produced in the same manner as in Example 1 using the monomer blend shown in Table 1 and the polyester resin obtained had physical properties as shown in Table 2. The polyester resin was formulated into a toner in the same manner as in Example 1 and then subjected to the same evaluation as in Example 1. As seen from Table 3, although the fixability was at a high level at 95%, the covering ratio stayed at about 50% due to generation of voids and therefore, the optical print density could be increased only to 1.10, failing to show satisfactory performance. The present inventors assume that this result was because, since crosslinking of the binder resin proceeded insufficiently, the melt viscosity at 200° C. was as low as 65 poises and the melt viscosity of toner was insufficient in comparison with the cohesion of toner at the time of melting for fixing of the toner, which results in the generation of voids.

Example 9

A polyester resin was produced in the same manner as in Example 1 using the monomer blend shown in Table 1 and the polyester resin obtained had physical properties as shown in Table 2. The polyester resin was formulated into a toner in the same manner as in Example 1 and then subjected to the same evaluation as in Example 1. As seen from Table 3, although the fixability and the void resistance were in a good balance such that the fixability was 80% and the covering ratio was 70%, they were low and far from a satisfactory level. Also, there arose a problem of generation of an irritating fixing odor.

Example 10

A polyester resin was produced in the same manner as in Example 1 using the monomer blend shown in Table 1 and the polyester resin obtained had physical properties as shown in Table 2. The polyester resin was formulated into a toner in the same manner as in Example 1 and then subjected to the same evaluation as in Example 1. As seen from Table 3, although the covering ratio was from 90 to 95%, the fixability was weak at 60% or lower and also the fixing odor was increased as compared with that of Example 9. The present inventors assume that this result was because the crosslinking of the binder resin proceeded excessively to raise the melt viscosity at 120° C. to 98,000 poises and as a result, the toner did not permeate sufficiently into the recording medium surface. In Examples 8 to 10, as the blending ratio of trimellitic acid anhydride was increased, the odor was markedly intensified and from this, it was confirmed that to suppress the amount of trimellitic acid anhydride to 3 mol % or less was important in view of a reduction in fixing odor.

Example 11

A polyester resin was produced in the same manner as in Example 1 using the monomer blend shown in Table 1 and the polyester resin obtained had physical properties as shown in Table 2. The polyester resin was formulated into a toner in the same manner as in Example 1 and then subjected to the same evaluation as in Example 1. As seen from Table 3, although the covering ratio was from 90 to 95%, the fixability was at an unsatisfactory level of 80%. Further, the fixing odor was remarkably increased as compared with that of Example 9 and thus the performance as a toner was insufficient.

Example 12

A polyester resin was produced in the same manner as in Example 1 using the monomer blend shown in Table 1 and the polyester resin obtained had physical properties as shown in Table 2. The polyester resin was formulated into a toner in the same manner as in Example 1 and then subjected to the same evaluation as in Example 1. As seen from Table 3, although the fixability was at a high level as 95%, the covering ratio stayed low at about 30% and therefore, the performance as a toner was not satisfactory. The present inventors assume that this phenomenon was caused because the melt viscosity at 200° C. was as low as 70 poises the same as the toner in Example 8 and accordingly, the melt viscosity of toner was insufficient in comparison with the cohesion of toner, which results in the generation of voids.

Example 13

A polyester resin was produced in the same manner as in Example 1 using the monomer blend shown in Table 1 and the polyester resin obtained had physical properties as shown in Table 2. The polyester resin was formulated into a toner in the same manner as in Example 1 and then subjected to the same evaluation as in Example 1. As seen from Table 3, although the fixability and the void resistance was on a high level such that the fixability in tape peeling test was 92% and the covering ratio was 92%, the glass transition temperature of toner was as low as 52° C. and as a result thereof, the toner suffered from impractical performance in view of storage stability.

Example 14

A polyester resin was produced in the same manner as in Example 1 using the monomer blend shown in Table 1 and the polyester resin obtained had physical properties as shown in Table 2. The polyester resin was formulated into a toner in the same manner as in Example 1 and then subjected to the same evaluation as in Example 1. As seen from Table 3, although the covering ratio was at a reasonable level at from 85 to 95%, the fixability was extremely low at 45% and the performance as a toner was not satisfactory. The present inventors assume that this phenomenon was affected by the absence of a soft segment having a methyl side chain in the molecular structure and also by the large molecular weight.

Example 15

A polyester resin was produced in the same manner as in Example 1 using the monomer blend shown in Table 1 and the polyester resin obtained had physical properties as shown in Table 2. The polyester resin was formulated into a toner in the same manner as in Example 1 and then subjected to the same evaluation as in Example 1. As seen from Table 3, although the fixability and the void resistance were in a good balance such that the fixability was 82% and the covering ratio was 74%, they were too low to be satisfactory. The present inventors assume that this was ascribable to the use of a monomer having a long side chain, however, the glass transition temperature was low for the binder having a high molecular weight and as a result, the storage stability was bad. Also, the binder generated an irritating fixing odor.

As described in the foregoing, toners using each of binders prepared in Examples 1 to 7 which fulfill the constituent factors described in claim 1 can show a performance favored with void resistance (covering ratio) and fixability at the same time. Further, the toners using each of binders prepared in Examples 1 to 5 which fulfill the constituent factors described in claims 1 to 3 can have both void resistance (covering ratio) and fixability at a higher level and also, show excellent performance with respect to storage stability, fixing odor and grinding efficiency in production.

TABLE 1

| Example | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Bis-phenol A polypropylene oxide 2-mol adduct | 30 | 20 | 12 | 30 | 30 | 30 | 40 | 30 | 30 | 30 | — | 30 | 20 | 60 | 70 |

TABLE 1-continued

| Example | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Bis-phenol A polyethylene oxide 2-mol adduct | 25 | 26 | 26 | 25 | 20 | 25 | 26 | 25 | 25 | 30 | — | 24 | 19 | 40 | 30 |
| Neopentyl glycol | — | 50 | — | — | — | — | — | — | — | — | 100 | — | — | — | — |
| 1,3-butanediol | 41 | — | — | 43 | 40 | 41 | — | 45 | 45 | 45 | — | 45 | 45 | — | — |
| 1,2-propylene glycol | — | — | 60 | — | — | — | — | — | — | — | — | — | — | — | — |
| 1,4-butanediol | — | — | — | — | — | — | 30 | — | — | — | — | — | — | — | — |
| Epi-bis type epoxy (Epicote 1001) | 2 | 2 | 1 | 0.7 | 5 | — | 2 | — | — | — | — | 0.5 | 5 | — | — |
| Epi-bis type epoxy (Epicote 1007) | — | — | — | — | — | 2 | — | — | — | — | — | — | — | — | — |
| Terephthalic acid | 60 | 70 | 65 | 60 | 60 | 60 | 60 | 60 | 60 | 60 | 45 | 63 | 63 | 85 | 60 |
| Isophthalic acid | 30 | 23 | 25 | 33 | 28 | 30 | 30 | 32 | 25 | 18 | 45 | 30 | 30 | — | — |
| Dodecenylsuccinic acid | — | — | — | — | — | — | — | — | — | — | — | — | — | — | 15 |
| Trimellitic acid anhydride | 2 | 1 | 2 | 0.5 | 3 | 2 | 2 | 0.5 | 3 | 10 | 10 | — | — | 7 | 5 |

TABLE 2

| Example | 1 | 2 | 3 | 4 | 5 | 6 | 7 | 8 |
|---|---|---|---|---|---|---|---|---|
| Melt viscosity (at 120 C.) | 52000 | 48000 | 42000 | 37000 | 64000 | 49000 | 65000 | 25000 |
| Melt viscosity (at 200 C.) | 120 | 110 | 100 | 90 | 130 | 120 | 130 | 65 |
| Peak top molecular weight | 5900 | 11400 | 6300 | 13200 | 5400 | 5900 | 12000 | 21000 |
| Number average molecular weight (Mn) | 2500 | 2800 | 2700 | 2900 | 3200 | 2400 | 3000 | 4200 |
| Weight average molecular weight (Mw) | 42500 | 50400 | 48600 | 34700 | 73600 | 36000 | 69000 | 25200 |
| Mw/Mn | 17 | 18 | 18 | 12 | 23 | 15 | 23 | 6 |
| Glass transition point (Tg) | 66 | 69 | 67 | 71 | 66 | 56 | 81 | 75 |
| Melting point (Tm) | 118 | 116 | 113 | 112 | 120 | 118 | 130 | 105 |
| Acid value (Av) | 9 | 10 | 6 | 5 | 11 | 6 | 11 | 3 |
| Gel proportion | 0 | 0 | 0 | 0 | 0 | 0 | 0 | 0 |

| Example | 9 | 10 | 11 | 12 | 13 | 14 | 15 |
|---|---|---|---|---|---|---|---|
| Melt viscosity (at 120° C.) | 61000 | 98000 | 72000 | 28000 | 6500 | 67000 | 63000 |
| Melt viscosity (at 200 C.) | 160 | 330 | 140 | 70 | 130 | 140 | 100 |
| Peak top molecular weight | 21000 | 21000 | 23000 | 14000 | 4800 | 21000 | 14200 |
| Number average molecular weight (Mn) | 4400 | 4000 | 4200 | 3000 | 2200 | 4000 | 3100 |
| Weight average molecular weight (Mw) | 88000 | 124000 | 138600 | 27000 | 44000 | 124000 | 65100 |
| Mw/Mn | 20 | 31 | 33 | 9 | 20 | 31 | 21 |
| Glass transition point (Tg) | 75 | 67 | 65 | 67 | 55 | 67 | 57 |
| Melting point (Tm) | 125 | 132 | 127 | 104 | 123 | 132 | 112 |
| Acid value (Av) | 7 | 12 | 17 | 5 | 4 | 2 | 9 |
| Gel proportion | 0 | 7 | 4 | 0 | 0 | 6 | 0 |

TABLE 3

| Example | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Fixing ratio (%) | 96 | 100 | 95 | 100 | 90 | 98 | 88 | 95 | 80 | 60 or less | 80 | 95 | 92 | 45 or | 82 |
| Covering ratio (void resistance) (%) | 95 | 93 | 92 | 88 | 95 | 95 | 92 | 50 | 70 | 90–95 | 92 | 30 | 92 | 85–95 | 74 |
| Optical Image density | 1.35 | 1.30 | 1.30 | 1.30 | 1.40 | 1.30 | 1.30 | 1.10 | 1.15 | 1.25 | 1.30 | 0.33 | 1.30 | 1.25 | 1.23 |
| Storage stability | ○ | ○ | ○ | ○ | ○ | x | ○ | Δ | ○ | ○ | ○ | x | x | ○ | x |
| Grindability | ○ | ○ | ○ | ○ | ○ | ○ | x | ○ | ○ | Δ | x | ○ | ○ | ○ | ○ |
| Fixing odor | ○ | ○ | ○ | ○ | ○ | ○ | ○ | ○ | Δ | x | Δ-x | ○ | ○ | x | x |
| General Evaluation | ○ | ○ | ○ | ○ | ○ | Δ | Δ | x | Δ | x | Δ-x | x | x | x | x |

Figure 3:
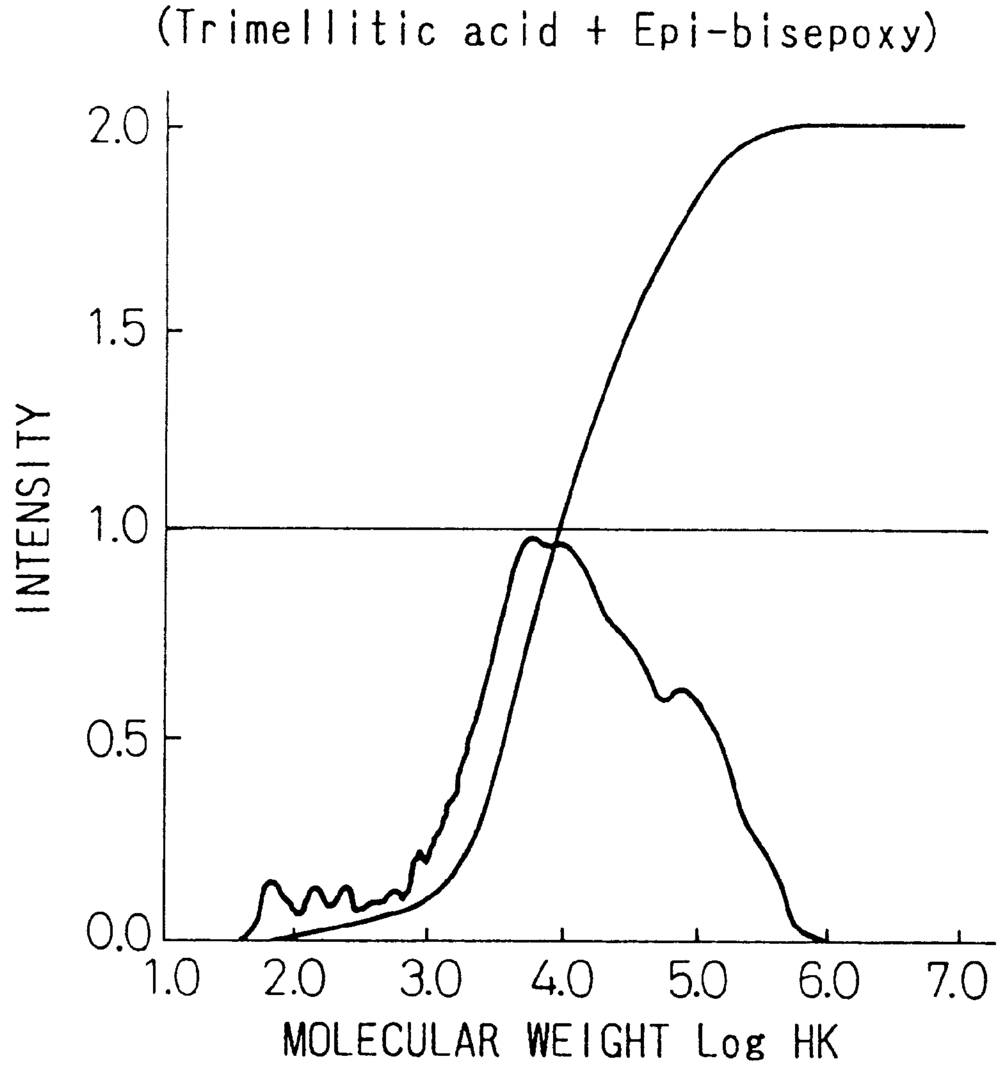
FIG. 3 is a graph showing the molecular weight of the binder consisting of trimellitic acid and an epi-bis type epoxy resin prepared in Example 1.
Figure 4:
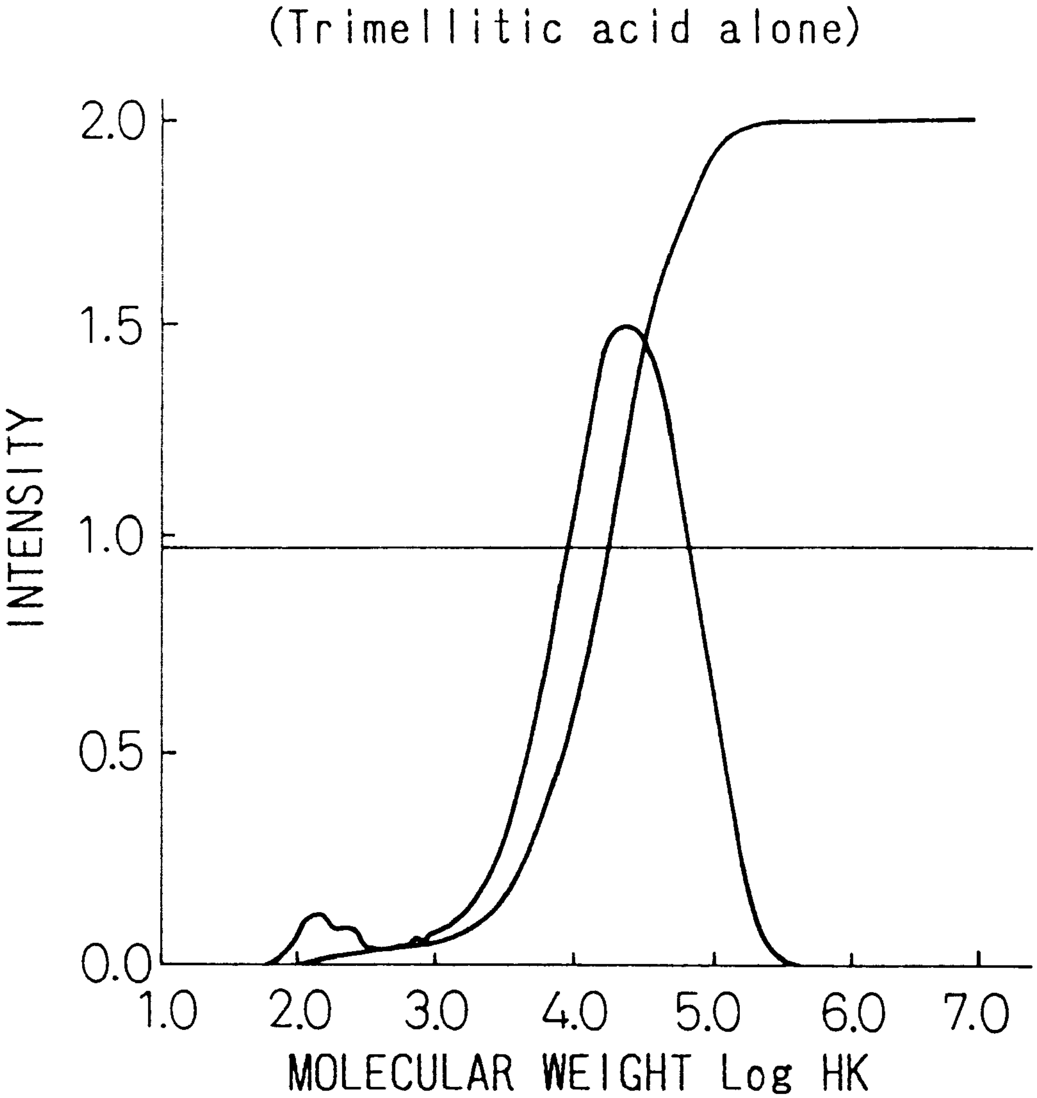
FIG. 4 is a graph showing the molecular weight distribution of the binder consisting only of trimellitic acid prepared in Example 8.
Figure 5:
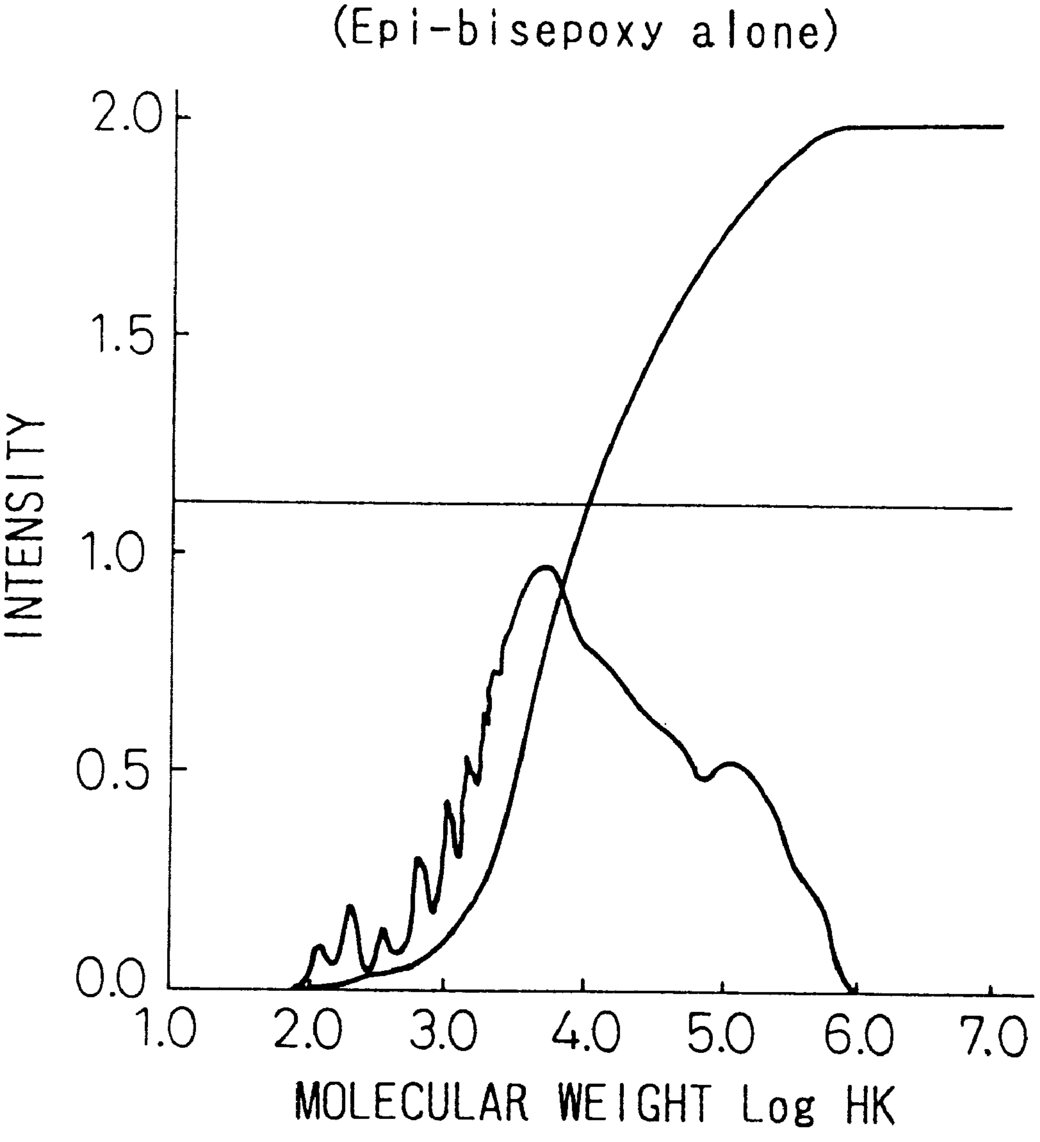
FIG. 5 is a graph showing the molecular weight distribution of the binder consisting only of an epi-bis epoxy resin prepared in Example 13.

FIGS. 3, 4 and 5 each show the molecular weight distribution of the toner binder produced in Example 1, Example 8 or Example 13, respectively. In Example 1, trimellitic acid and an epi-bis type epoxy are used in combination as crosslinking agents, in Example 8, trimellitic acid only is used as a crosslinking agent and in Example 13, an epi-bis type epoxy only is used as a crosslinking agent. It can be seen from these figures that, by using a trimellitic acid and an epi-bis type epoxy in combination as crosslinking agents, the molecular weight distribution can be freely controlled.

We claim:

1. A toner binder comprising a crosslinked polyester resin formed with crosslinking components of trimellitic acid in an amount of 0.1 to 3% by mole of all acid components and an epi-bis epoxy of the formula

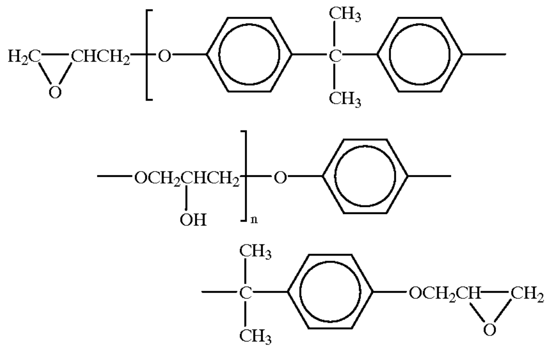

in an amount of 0.1 to 5% by mole of all alcohol components, said crosslinked polyester resin having a number average molecular weight Mn of 2000 to 4000 and a ratio of weight average molecular weight to number average molecular weight Mw/Mn of 10 to 25 wherein said number average and weight average molecular weights are determined using a chromatogram obtained by gel permeation chromatography of a non-gel portion of said polyester resin, said crosslinked polyester resin having a percent gel of a residue not dissolved in tetrahydrofuran of 1% by weight or less.

2. The toner binder according to claim 1, wherein said toner binder is formed using, as essential monomers, terephthalic acid and/or isophthalic acid in an amount of 80% by mole or more of all acid components; an aliphatic diol having a methyl side chain and 5 or less carbon atoms in an amount of 15 to 70% by mole of all alcohol components, and an etherified bisphenol A in an amount of 30 to 85% by weight of all alcohol components; and the epi-bis epoxy in an amount of 0.1 to 5% by weight based on the total weight of all the alcohol components.

3. The toner binder according to claim 1 wherein said epi-bis epoxy has a molecular weight of 1500 or less.

4. Toner binder according to claim 2 wherein said alcohol components used in combination with said epi-bis epoxy are selected from the group consisting of etherified bisphenol A, 1,2-propylene glycol, 1,3-butadiol and neopentyl glycol.

5. The toner binder according to claim 2 wherein said acid components are selected from the group consisting of terephthalic acid and isophthalic acid.

6. The toner binder according to claim 2 wherein the ratio of the number of carboxyl groups in all acid components to the number of hydroxyl groups in all alcohol components is within the range between 0.8 to 1.2.

7. A toner for flash fixing comprising as an essential component the binder described in claim 1.

8. A toner for flash fixing comprising as an essential component the binder described in claim 2.

* * * * *